US010588123B2

(12) United States Patent
Khlat

(10) Patent No.: US 10,588,123 B2
(45) Date of Patent: Mar. 10, 2020

(54) CIRCUITRY AND METHODS FOR TIME DIVISION DUPLEX CARRIER AGGREGATION

(71) Applicant: QORVO US, INC., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 63 days.

(21) Appl. No.: 14/939,272

(22) Filed: Nov. 12, 2015

(65) Prior Publication Data
US 2016/0149690 A1    May 26, 2016

Related U.S. Application Data

(60) Provisional application No. 62/082,924, filed on Nov. 21, 2014.

(51) Int. Cl.
*H04W 72/04*      (2009.01)
*H04L 5/00*       (2006.01)
*H04L 5/14*       (2006.01)

(52) U.S. Cl.
CPC ......... *H04W 72/0446* (2013.01); *H04L 5/001* (2013.01); *H04L 5/1469* (2013.01)

(58) Field of Classification Search
CPC ... H04L 12/433; H04L 49/357; H04L 9/3247; H04L 12/42; H04L 12/4637; H04L 2209/043; H04L 2209/125; H04L 2209/20; H04L 2209/60; H04L 41/0681; H04L 43/0817; H04L 45/00; H04L 45/18; H04L 45/245
See application file for complete search history.

(56) References Cited

U.S. PATENT DOCUMENTS

| | | | |
|---|---|---|---|
| 2010/0202325 A1* | 8/2010 | Poulin | H04B 1/006 370/280 |
| 2013/0250820 A1* | 9/2013 | Khlat | H04B 1/0057 370/280 |

(Continued)

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.3.0, 3GPP Organizational Partners, Sep. 2014, 378 pages.

(Continued)

*Primary Examiner* — Jeffrey M Rutkowski
*Assistant Examiner* — Chae S Lee
(74) *Attorney, Agent, or Firm* — Withrow & Terranova, P.L.L.C.

(57) ABSTRACT

Circuitry includes an antenna node, a number of input/output nodes, radio frequency (RF) multiplexer circuitry, and bypass circuitry. The RF multiplexer circuitry is coupled between the input/output nodes and the antenna node. The bypass circuitry is coupled to the input/output nodes and the antenna node. The bypass circuitry is configured to, in each uplink time slot of a TDD frame, couple one of the input/output nodes directly to the antenna node such that the RF multiplexer circuitry is bypassed. Further, the bypass circuitry is configured to, in each downlink time slot of the TDD frame, couple each one of the input/output nodes to the antenna node via the RF multiplexer circuitry.

12 Claims, 17 Drawing Sheets

(56) References Cited

U.S. PATENT DOCUMENTS

2014/0086109 A1\* 3/2014 Bagger .................... H04B 1/48
370/278
2016/0020737 A1\* 1/2016 Kong ........................ H03F 3/19
455/73
2017/0170945 A1\* 6/2017 Ji ............................. H04L 5/14

OTHER PUBLICATIONS

"Author Unknown, ""Technical Specification Group Radio Access Network; Evolved Universal Terrestrial Radio Access (E-UTRA); User Equipment (UE) radio transmission and reception(Release 12),"" Technical Specification 36.101, Version 12.5.0, 3GPP Organizational Partners, Sep. 2014, 536 pages".
Ericsson, "R4-142271: TDD UL/DL subframe configurations in requirements," 3rd Generation Partnership Project (3GPP), TSG-RAN WG4 Meeting #70bis, Mar. 31-Apr. 4, 2014, 4 pages, San Jose Del Cabo, Mexico.

\* cited by examiner

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*
*(RELATED ART)*

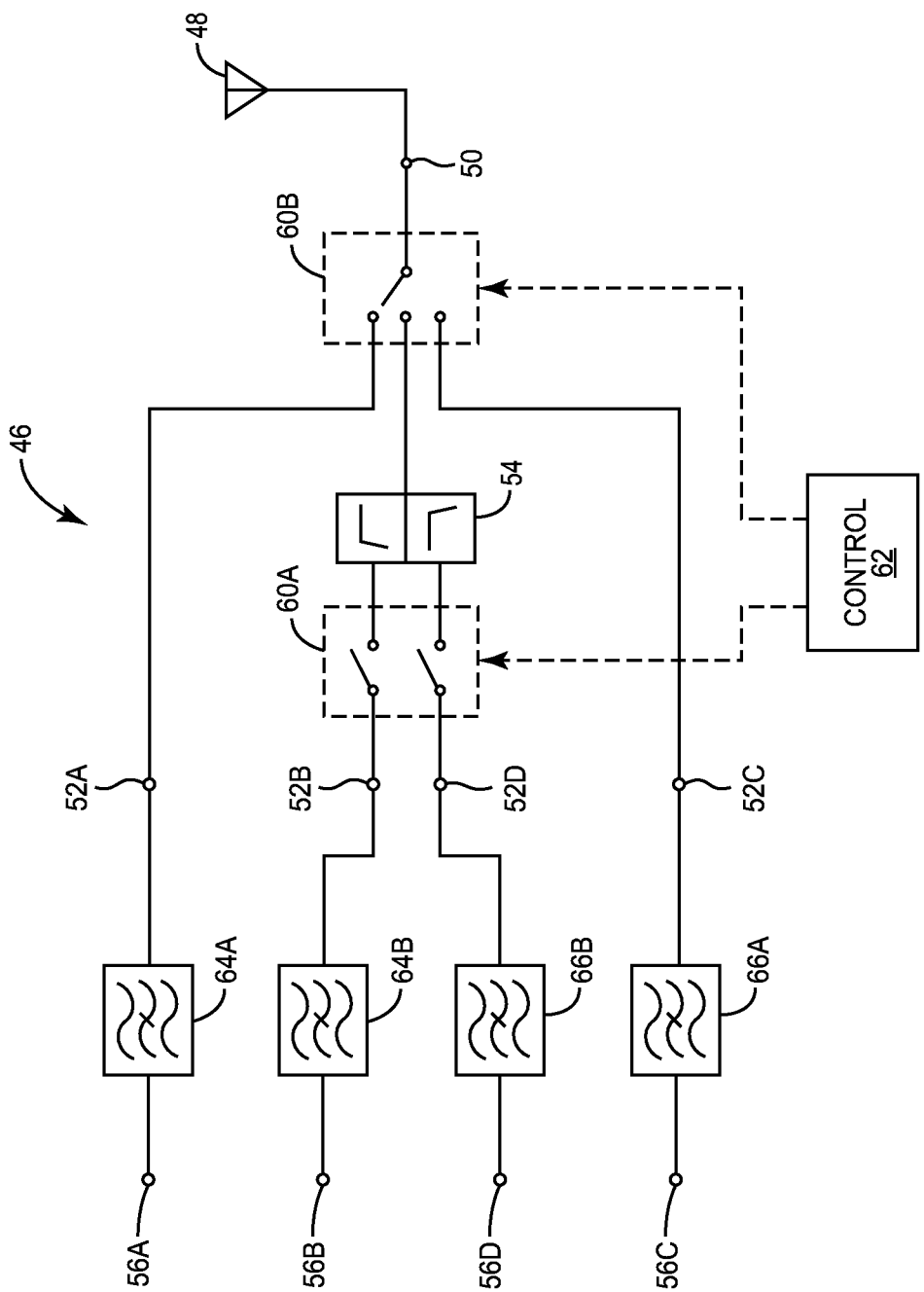

CIRCUITRY AND METHODS FOR TIME DIVISION DUPLEX CARRIER AGGREGATION

RELATED APPLICATIONS

This application claims the benefit of U.S. provisional patent application No. 62/082,924, filed Nov. 21, 2014, the disclosure of which is incorporated herein by reference in its entirety.

FIELD OF THE DISCLOSURE

The present disclosure relates to circuitry and methods for improving the performance of time division duplex (TDD) carrier aggregation.

BACKGROUND

Modern mobile telecommunications standards continue to demand increasingly greater rates of data exchange (data rates). One way to increase the data rate of a wireless communications device is through the use of carrier aggregation. Carrier aggregation allows a single wireless communications device to aggregate bandwidth across one or more operating bands in the wireless spectrum. The increased bandwidth achieved as a result of carrier aggregation allows a wireless communications device to obtain higher data rates than have previously been available.

FIG. 1 shows a table describing a number of wireless communication operating bands in the wireless spectrum. One or more of the operating bands may be used, for example, in a Code Division Multiple Access (CDMA), Global System for Mobile Communications (GSM), Long Term Evolution (LTE), or LTE-advanced equipped wireless communications device. The first column indicates the operating band number for each one of the operating bands. The second and third columns indicate the uplink and downlink frequency bands for each one of the operating bands, respectively. Finally, the fourth column indicates the duplex mode of each one of the operating bands. In non-carrier aggregation configurations, a wireless communications device will generally communicate using a single portion of the uplink or downlink frequency bands within a single operating band. In carrier aggregation applications, however, a wireless communications device may aggregate bandwidth across a single operating band or multiple operating bands in order to increase the data rate of the device.

FIG. 2A shows a diagram representing a conventional, non-carrier aggregation configuration for a wireless communications device. In this conventional configuration, a wireless communications device communicates using a single portion of a wireless spectrum 10 within a single operating band 12. Under the conventional approach, the data rate of the wireless communications device is constrained by the limited available bandwidth.

FIGS. 2B-2D show diagrams representing a variety of carrier aggregation configurations for a wireless communications device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern wireless communications device should be capable of supporting each one of the previously described carrier aggregation configurations.

The various carrier aggregation configurations discussed above can be performed between two or more frequency division duplexing (FDD) bands, two or more time division duplexing (TDD) bands, or a combination thereof. Generally, a wireless communications device will aggregate bandwidth when receiving data (i.e., during downlink), but will use a single operating band when transmitting data (i.e., during uplink). However, carrier aggregation may also be used during data transfer to increase uplink throughput.

FIG. 3 shows conventional front end circuitry 30 for a wireless communications systems capable of operating in one or more carrier aggregation configurations. The conventional front end circuitry 30 includes an antenna 32, a diplexer 34, a first duplexer 36A, and a second duplexer 36B. The diplexer 34 is coupled between the antenna 32, a first input/output node 38A, and a second input output node 38B. The first duplexer 36A is coupled between the first input/output node 38A, a first transceiver node 40A, and a second transceiver node 40B. The second duplexer 36B is coupled between the second input/output node 38B, a third transceiver node 40C, and a fourth transceiver node 40D.

When receiving, RF receive signals from the antenna 32 are provided to the diplexer 34, where they are separated into high-band RF receive signals and low-band RF receive signals. The high-band RF receive signals are delivered to the first input/output node 38A, while the low-band RF receive signals are delivered to the second input/output node 38B. The first duplexer 36A then isolates RF receive signals within one or more high-band operating bands from the high-band RF receive signals, delivering the isolated RF receive signals to the second transceiver node 40B. Similarly, the second duplexer 36B isolates RF receive signals within one or more low-band operating bands from the low-band RF receive signals, delivering the isolated RF receive signals to the fourth transceiver node 40D.

When transmitting, an RF transmit signal is provided to one of the first transceiver node 40A and the third transceiver node 40C. Specifically, one of a high-band RF transmit signal and a low-band RF transmit signal is provided to the first transceiver node 40A and the second transceiver node 40B, respectively. Filtering is performed on the RF transmit signal as it passes through either the first duplexer 36A or the second duplexer 36B, depending on the origin of the RF transmit signal. The RF transmit signal is then delivered to the antenna 32 via the diplexer 34.

Due to the configuration of the diplexer 34, the first duplexer 36A, and the second duplexer 36B, the conventional RF front end circuitry 30 is capable of operating in carrier aggregation configurations between a high-band operating band and a low-band operating band, however, the performance of the circuitry may be limited when transmitting RF signals. As will be appreciated by those skilled in the art, the diplexer 34, while necessary to ensure that the conventional RF front end circuitry 30 can isolate and thus simultaneously receive signals within the high-band operating band and the low-band operating band, adds significant insertion loss into the transmit path of the conventional RF front end circuitry 30. This in turn degrades the efficiency of the circuitry when transmitting RF signals and thus reduces the battery life of a wireless communications device in which the conventional RF front end circuitry 30 is incorporated.

FIG. 4 illustrates a TDD frame 42 for an LTE network according to one embodiment of the present disclosure. As shown in FIG. 4, the TDD frame 42 is divided into a number of timeslots 44. Each timeslot is designated for a certain function, such as downlink (DL), in which RF signals are received by a wireless communications device, uplink (UL), in which RF signals are transmitted by a wireless communications device, special (S), which is used to transition between downlink and uplink modes, or some combination of the above. In a TDD architecture, a wireless communications device will generally allocate the timeslots 44 according to instructions from a base station or internal logic within the device itself.

As discussed above, the conventional RF front end circuitry 30 may be capable of aggregating one or more TDD bands in order to simultaneously receive signals at two different frequencies during a downlink timeslot 44. However, the RF filtering circuitry required to support such a carrier aggregation configuration generates significant insertion loss in a transmit path of the conventional RF front end circuitry 30, thereby leading to reduced performance during an uplink timeslot 44.

In light of the above, there is a need for improved RF front end circuitry for carrier aggregation configurations. Specifically, there is a need for RF front end circuitry with improved performance when aggregating bandwidth between two or more TDD operating bands.

SUMMARY

The present disclosure relates to circuitry and methods for improving the performance of time division duplex (TDD) carrier aggregation. In one embodiment, circuitry includes an antenna node, a number of input/output nodes, radio frequency (RF) multiplexer circuitry, and bypass circuitry. The RF multiplexer circuitry is coupled between the input/output nodes and the antenna node. The RF multiplexer circuitry is configured to pass RF signals within a first frequency band between the antenna node and a first one of the input/output nodes, while attenuating RF signals outside of the first frequency band. Further, the RF multiplexer circuitry is configured to pass RF signals about a second frequency band between the antenna node and a second one of the input/output nodes, while attenuating RF signals outside the second frequency band. The bypass circuitry is coupled to the input/output nodes and the antenna node. The bypass circuitry is configured to, in each uplink time slot of a TDD frame, couple one of the input/output nodes directly to the antenna node such that the RF multiplexer circuitry is bypassed. Further, the bypass circuitry is configured to, in each downlink time slot of the TDD frame, couple each one of the input/output nodes to the antenna node via the RF multiplexer circuitry. By providing the RF multiplexer in the receive path during the downlink timeslots of the TDD frame, the circuitry is capable of simultaneously receiving RF signals within two different TDD operating bands. Further, by bypassing the RF multiplexer circuitry during the uplink timeslots of the TDD frame, the insertion loss in a transmit path of the circuitry is significantly decreased, thereby improving the performance thereof.

In one embodiment, a method includes the steps of, in each uplink time slot of a TDD frame, coupling one of a number of input/output nodes directly to an antenna node such that an RF signal provided at the one of the input/output nodes is provided directly to the antenna, and, in each downlink timeslot of the TDD frame, coupling the antenna node to each one of the input/output nodes via RF multiplexer circuitry such that RF receive signals provided at the antenna node are separated into RF signals within a first frequency band, which are selectively delivered to a first one of the input/output nodes, and RF signals within a second frequency band, which are selectively delivered to a second one of the input/output nodes. Accordingly, two RF receive signals may be simultaneously received while reducing insertion loss in a transmit path during transmission of an RF signal.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a table showing a number of radio frequency (RF) operating bands and corresponding information.

FIGS. 7A-7C illustrate RF front end circuitry according to one embodiment of the present disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 2A:
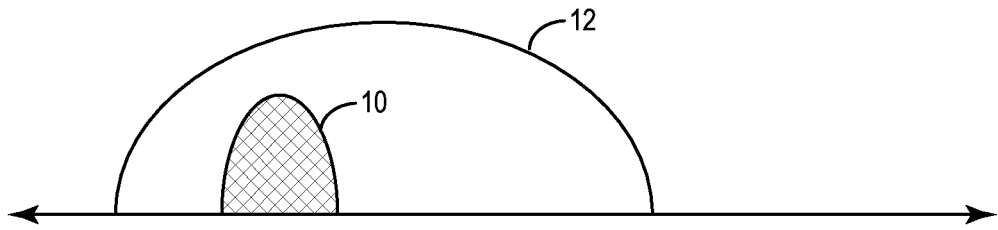
FIGS. 2A-2D are diagrams illustrating a variety of carrier aggregation configurations for a wireless communications device.
Figure 2B:
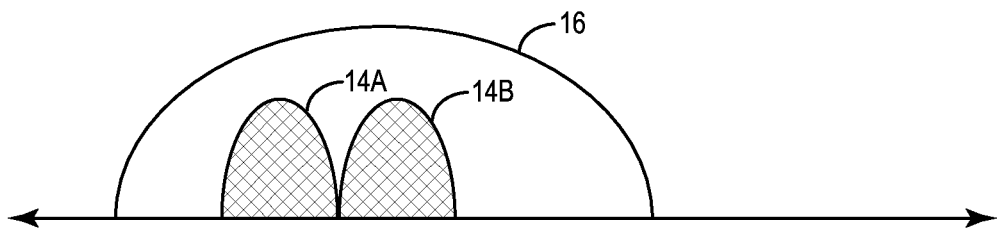
Figure 2C:
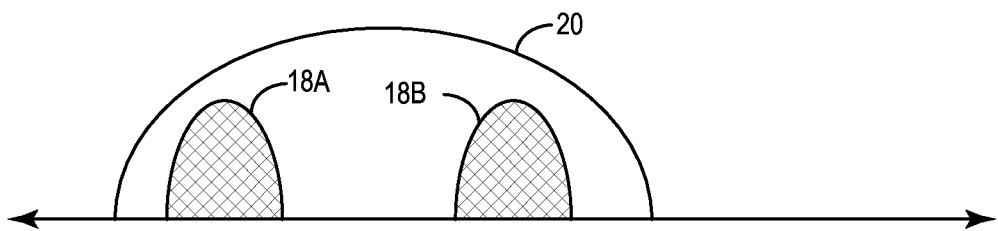
Figure 2D:
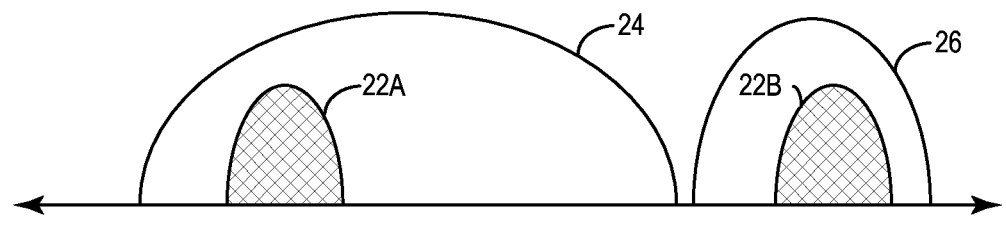
Figure 3:
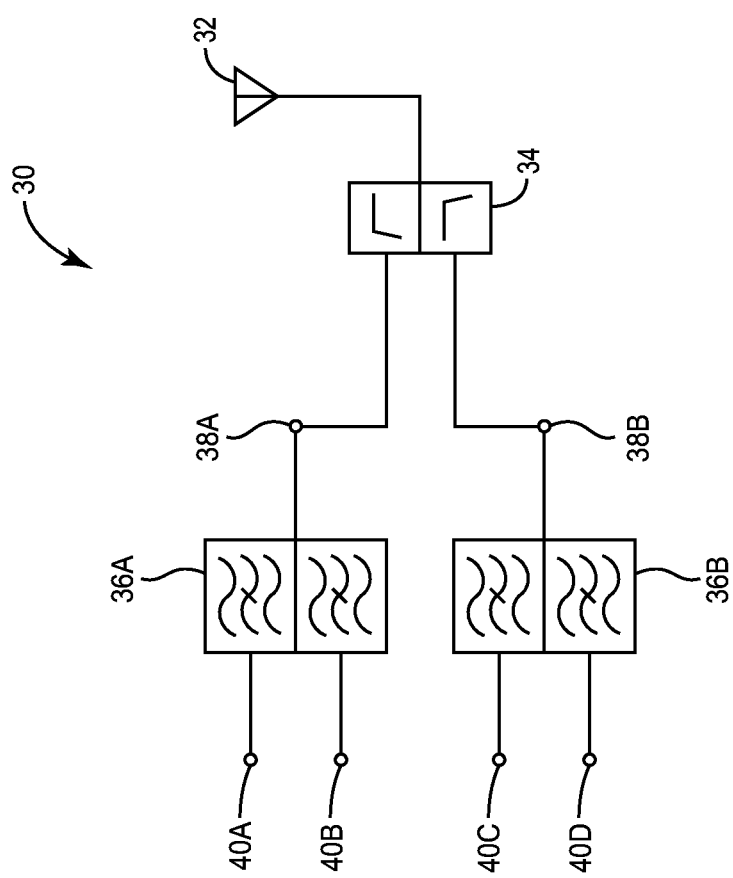
FIG. 3 is a schematic representation of conventional RF front end circuitry.
Figure 4:
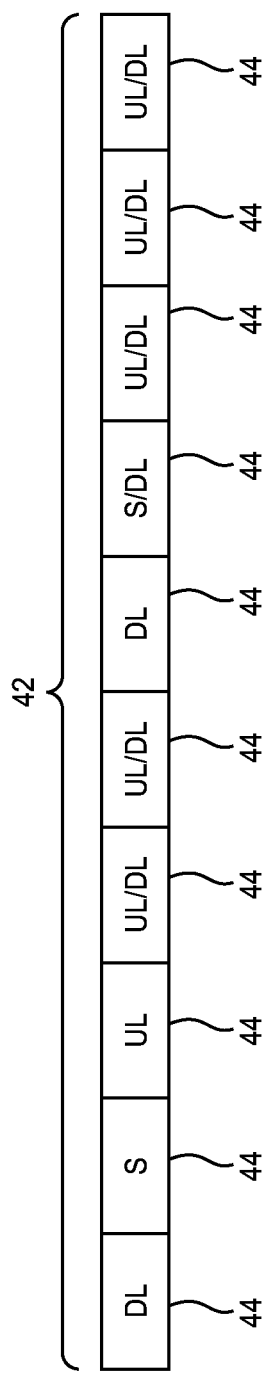
FIG. 4 is a diagram illustrating the architecture of a time division duplex (TDD) frame.
Figure 5A:
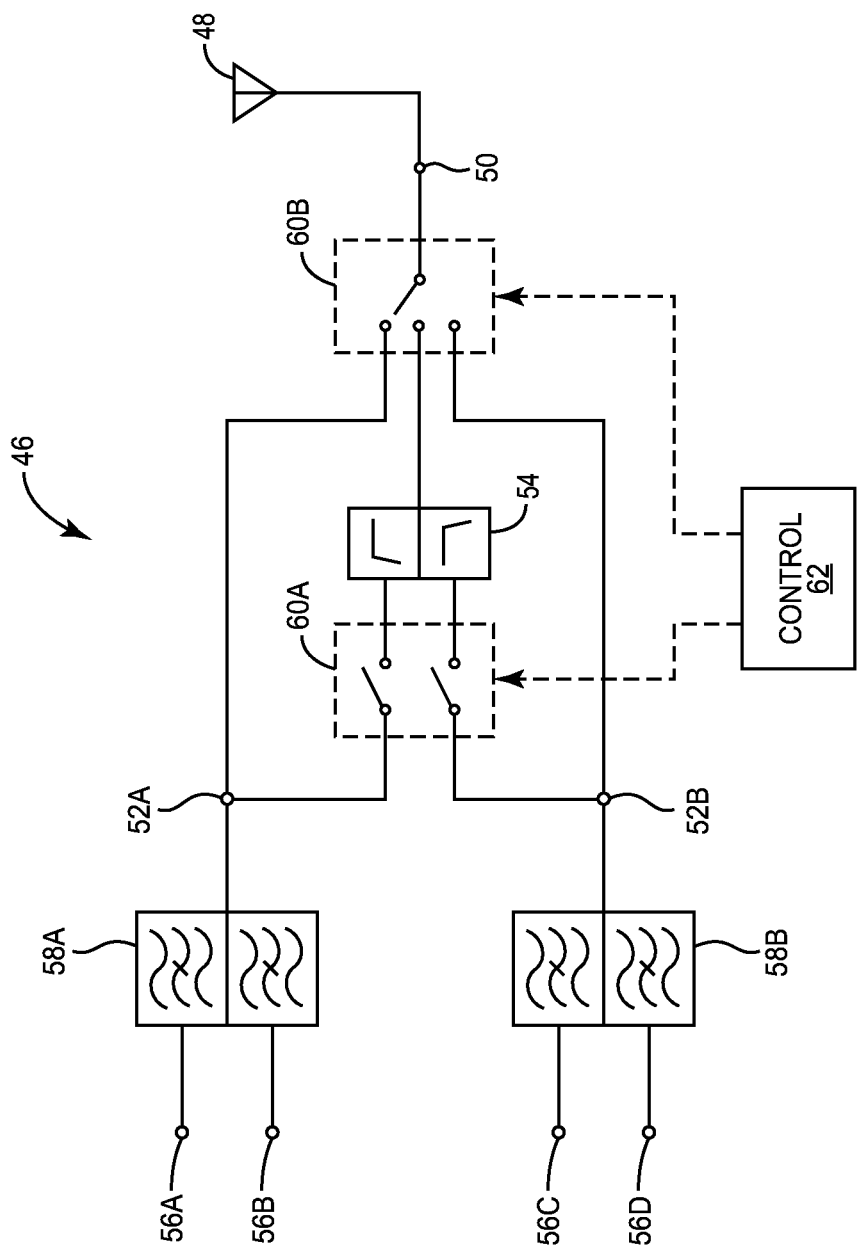
FIGS. 5A-5C illustrate RF front end circuitry according to one embodiment of the present disclosure.

FIG. 5A shows radio frequency (RF) front end circuitry 46 for a wireless communications device according to one embodiment of the present disclosure. The RF front end circuitry 46 includes an antenna 48, an antenna node 50 coupled to the antenna 48, a number of input/output nodes 52 (shown as a first input/output node 52A and a second input/output node 52B), RF multiplexer circuitry 54 (shown as a diplexer) coupled between the antenna node 50 and the input/output nodes 52, a number of transceiver nodes 56, duplexer circuitry 58 (shown separately as a first duplexer 58A and a second duplexer 58B) coupled between the input/output nodes 52 and the transceiver nodes 56, and bypass circuitry 60 coupled to the antenna node 50 and the input/output nodes 52 (shown separately as first bypass circuitry 60A and second bypass circuitry 60B). The first duplexer 58A is coupled between a first one of the first input/output node 52A, a first transceiver node 56A, and a second transceiver node 56B. The second duplexer 58B is coupled between the second input/output node 52B, third transceiver node 56C, and a fourth transceiver node 56D.

The first bypass circuitry 60A is coupled between the input/output nodes 52 and the RF multiplexer circuitry 54. The second bypass circuitry 60B is coupled between the antenna node 50, the input/output nodes 52, and the RF multiplexer circuitry 54. The first bypass circuitry 60A is a dual-pole, dual-throw (DPDT) switch configured to selectively couple the input/output nodes 52 to the RF multiplexer circuitry 54. The second bypass circuitry 60B is a single-pole, three-throw (SP3T) switch configured to selectively couple one of the first input/output node 52A, the second input/output node 52B, and the RF multiplexer circuitry 54 to the antenna node 50. Bypass control circuitry 62 is coupled to the first bypass circuitry 60A and the second bypass circuitry 60B in order to control the orientation of the switches therein.

While the bypass circuitry 60 is shown with a DPDT switch and SP3T switch, the bypass circuitry 60 may be made using any number of individual or grouped switches without departing from the principles of the present disclosure. Further, the routing of connections to the various switches in the bypass circuitry 60 may be accomplished in many different ways to accomplish the same objectives as discussed herein without departing from the principles of the present disclosure.

Figure 5B:
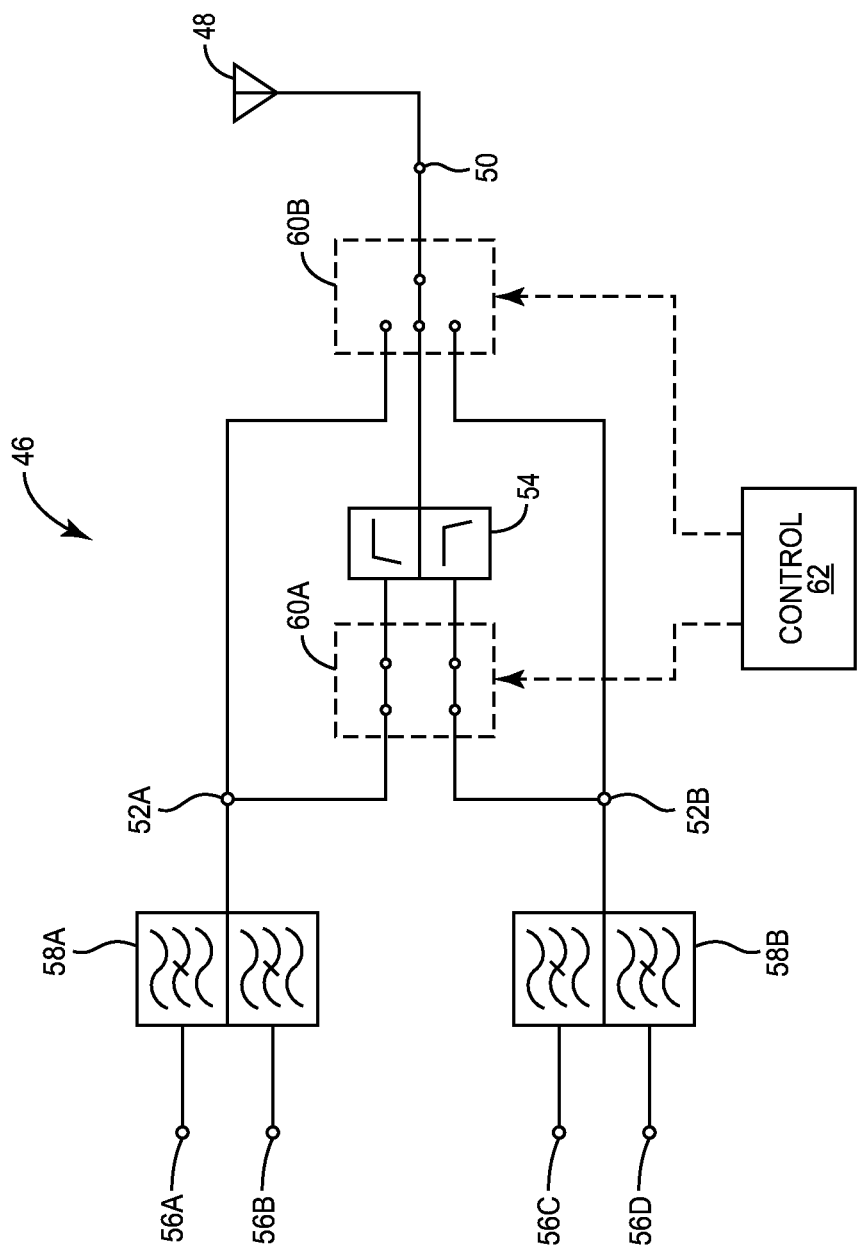

The RF front end circuitry 46 is configured to operate in one or more carrier aggregation configurations in which bandwidth from at least a first time division duplexing (TDD) band and a second TDD band is aggregated. When receiving, i.e., during a timeslot of a TDD frame designated for downlink, the bypass control circuitry 62 is configured to couple the antenna node 50, the first input/output node 52A, and the second input/output node 52B to the RF multiplexer circuitry 54 as shown in FIG. 5B. Accordingly, RF receive signals from the antenna 48 are provided to the RF multiplexer circuitry 54, where they are separated into high-band RF receive signals and low-band RF receive signals. The high-band RF receive signals are delivered to the first input/output node 52A, while the low-band RF receive signals are delivered to the second input/output node 52B. The first duplexer 58A then isolates RF receive signals within one or more high-band operating bands from the high-band RF receive signals, delivering the isolated RF receive signals to the second transceiver node 56B. Similarly, the second duplexer 58B isolates RF receive signals within one or more low-band operating bands from the low-band RF receive signals, delivering the isolated RF receive signals to the fourth transceiver node 56D. Accordingly, two RF receive signals may be simultaneously received by the RF front end circuitry 46.

Figure 5C:
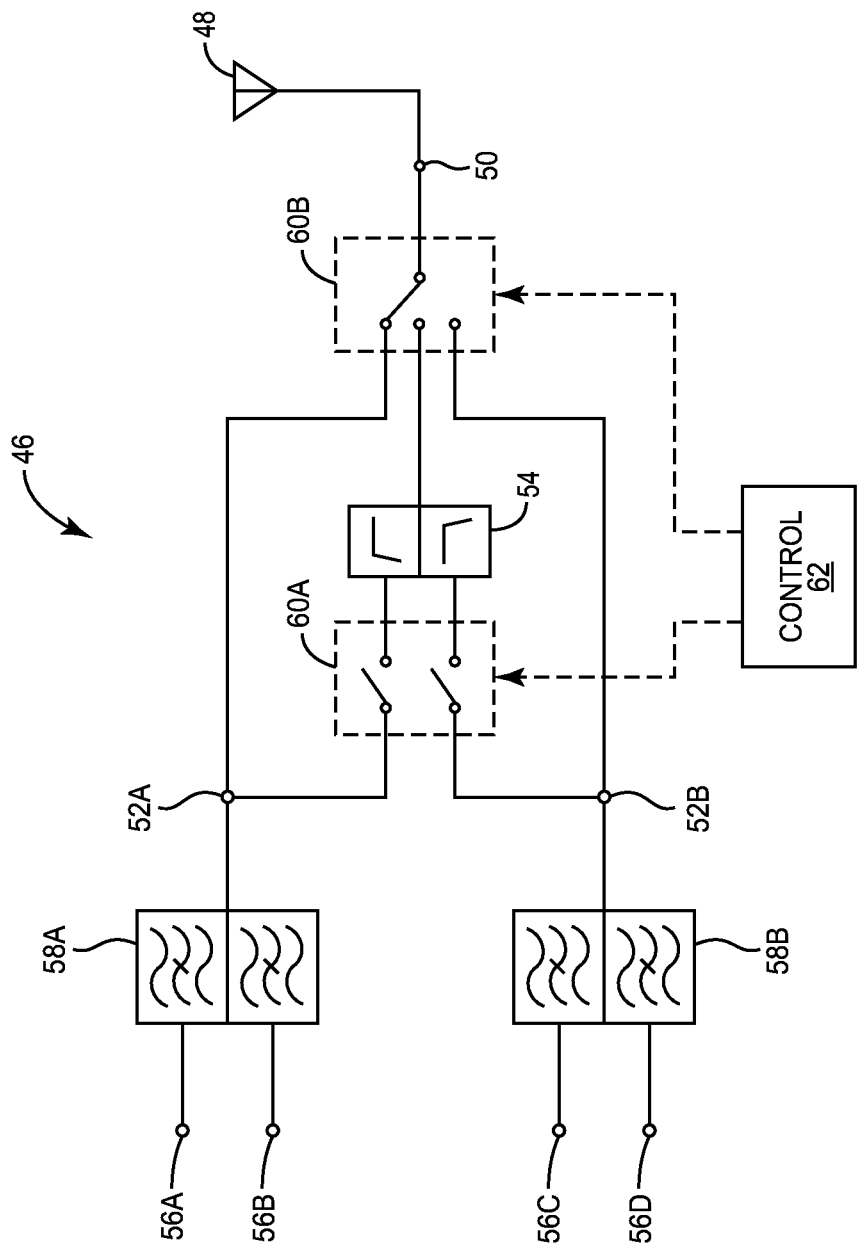

When transmitting, i.e., during a timeslot of a TDD frame designated for uplink, the bypass control circuitry 62 is configured to couple the antenna node 50 directly to one of the input/output nodes 52 to bypass the RF multiplexer circuitry 54 and thus reduce insertion loss in the transmit path of the RF front end circuitry 46 as shown in FIG. 5C. Further, the antenna node 50 and the remaining input/output nodes 52 may be isolated from the RF multiplexer circuitry 54 to avoid loading the transmit path. In the example shown in FIG. 5C, an RF transmit signal is provided at the first transceiver node 56A, and only the first input/output node 52A is coupled to the antenna node 50, such that a direct path from the first transceiver node 56A and the antenna 48 is provided. The remaining switches are left open to avoid indirectly loading the transmit path. Accordingly, an RF transmit signal provided at the first transceiver node 56A is filtered by the first duplexer 58A and provided directly to the antenna, completely bypassing the RF multiplexer circuitry 54. This results in significant reductions in the insertion loss of the transmit path, which increases efficiency and improves battery life. While discussed above with respect to an RF transmit signal provided at the first transceiver node 56A, the same principles of operation apply to RF transmit signals provided at the third transceiver node 56C, and will be appreciated by those skilled in the art.

The bypass control circuitry 62 operates the switches in the bypass circuitry 60 to synchronize with the timeslots within a TDD frame. As discussed above, the configuration of the switches changes based on whether the particular timeslot is an uplink timeslot or a downlink timeslot. Further, the configuration of the switches changes based on whether an RF transmit signal is provided at the first transceiver node 56A or the third transceiver node 56C. Providing the bypass circuitry 60 and operating it in this manner allows the RF front end circuitry 46 to operate in carrier aggregation modes in which bandwidth from two or more TDD operating bands is aggregated while avoiding the decreased transmit performance normally associated with such configurations.

Figure 6A:
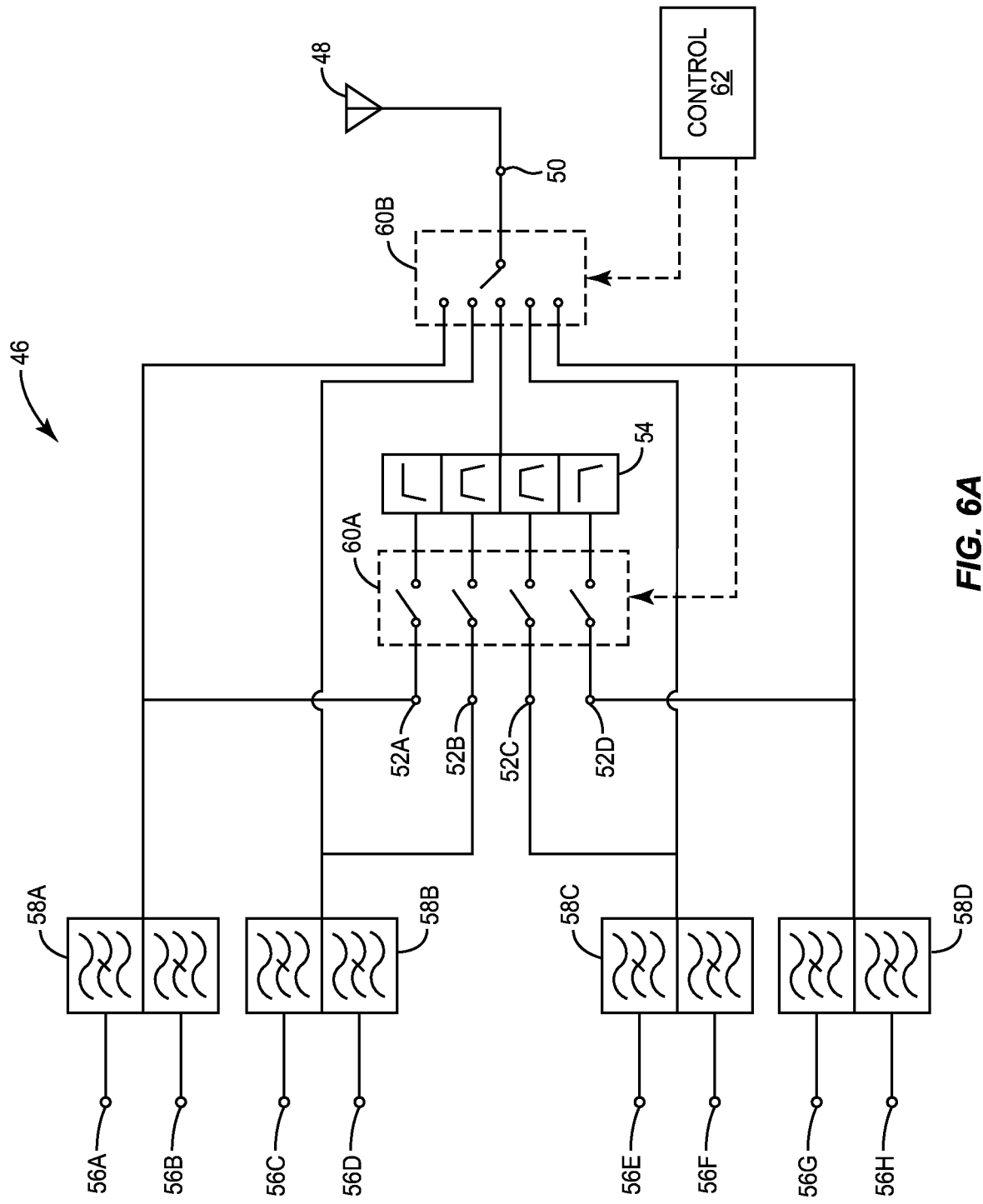
FIGS. 6A-6C illustrate RF front end circuitry according to one embodiment of the present disclosure.

FIG. 6A shows the RF front end circuitry 46 according to an additional embodiment of the present disclosure. The RF front end circuitry 46 is substantially similar to that shown in FIG. 5A, except that the RF multiplexer circuitry 54 is a quadplexer rather than a diplexer. To support this configuration, the first bypass circuitry 60A is a four-pole, four-throw (4P4T) switch, while the second bypass circuitry 60B is a single-pole, five-throw (SP5T) switch. As discussed above, the particular grouping, orientation, and routing of connections between these switches is merely exemplary and may be accomplished in many different ways, all of which are contemplated herein. In the RF front end circuitry 46 discussed above in FIG. 5A, the diplexer merely provided high-pass and low-pass filtering, which may limit the operating bands available for carrier aggregation in some circumstances. Using a quadplexer for the RF multiplexer circuitry 54 allows for the separation of low-band RF signals, mid-band RF signals, high-band RF signals, and ultra high-band RF signals. While not shown, quintplexers, hexaplexers, or multiplexers of any order may be used to further separate RF signals in the RF front end circuitry 46. For example, a quintplexer may be used to separate RF signals into low-band RF signals, low/mid-band RF signals, mid-band RF signals, high-band RF signals, and ultra high-band RF signals. A third duplexer 58C and a fourth duplexer 58D are provided to separate mid-band RF transmit and receive signals and ultra high-band RF transmit and receive signals, respectively, as discussed above. Further, additional input/output nodes (specifically a third input/output node 52C and a fourth input/output node 52D), as well as additional transceiver nodes (specifically a fifth transceiver node 56E, a sixth transceiver node 56F, a seventh transceiver node 56G, and an eighth transceiver node 56H) are provided to support the additional RF signal bands afforded by using the quadplexer. The third duplexer 58C is coupled between the third input/output node 52C, the fifth transceiver node 56E, and the sixth transceiver node 56F. The fourth duplexer 58D is coupled between the fourth input/output node 52D, the seventh transceiver node 56G, and the eighth transceiver node 56H.

Figure 6B:
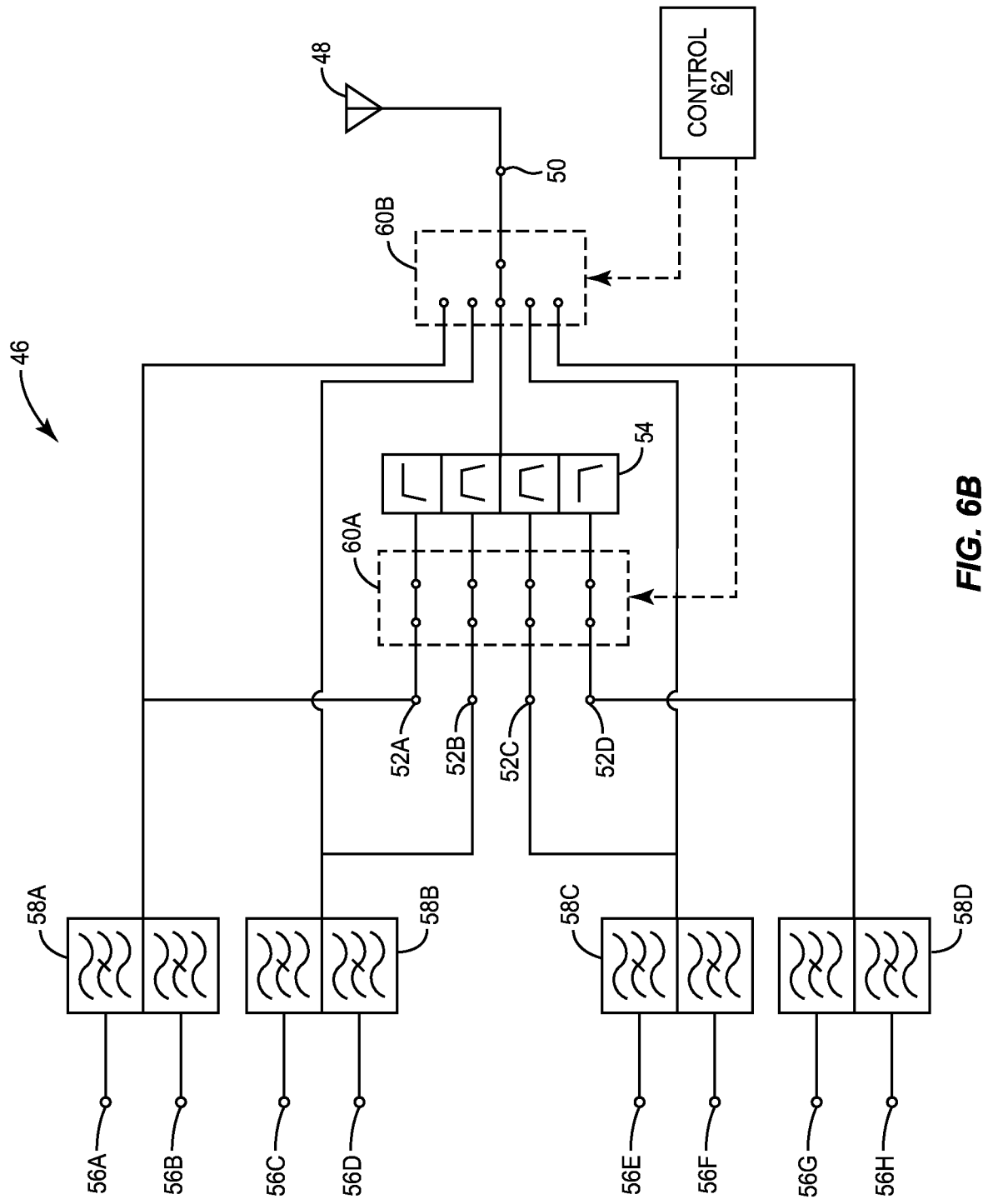

The operation of the RF front end circuitry 46 shown in FIG. 6A is substantially similar to that discussed above. When receiving, i.e., during a timeslot of a TDD frame designated for downlink, the bypass control circuitry 62 is configured to couple the antenna node 50, and two or more of the input/output nodes 52 to the RF multiplexer circuitry 54, as shown in FIG. 6B. Accordingly, RF receive signals from the antenna 48 are provided to the RF multiplexer circuitry 54, wherein they are separated into ultra high-band RF receive signals, high-band RF receive signals, mid-band RF receive signals, and low-band RF receive signals. The ultra-high band receive signals are delivered to the first input/output node 52A, the high-band receive signals are delivered to the second input/output node 52B, the mid-band RF signals are delivered to the third input/output node 52C, and the low-band RF signals are delivered to the fourth input/output node 52D. The first duplexer 58A isolates RF receive signals within one or more ultra high-band operating bands from the ultra high-band RF receive signals, delivering the isolated RF receive signals to the second transceiver node 56B. The second duplexer 58B isolates RF receive signals within one or more high-band operating bands from the high-band RF receive signals, delivering the isolated RF receive signals to the fourth transceiver node 56D. The third duplexer 58C isolates RF receive signals within one or more mid-band operating bands from the mid-band RF receive signals, delivering the isolated RF receive signals to the sixth transceiver node 56F. The fourth duplexer 58D isolates RF receive signals within one or more low-band operating bands from the low-band RF receive signals, delivering the isolated RF receive signals to the eighth transceiver node 56H. Accordingly, four RF receive signals may be simultaneously received by the RF front end circuitry 46.

Figure 6C:
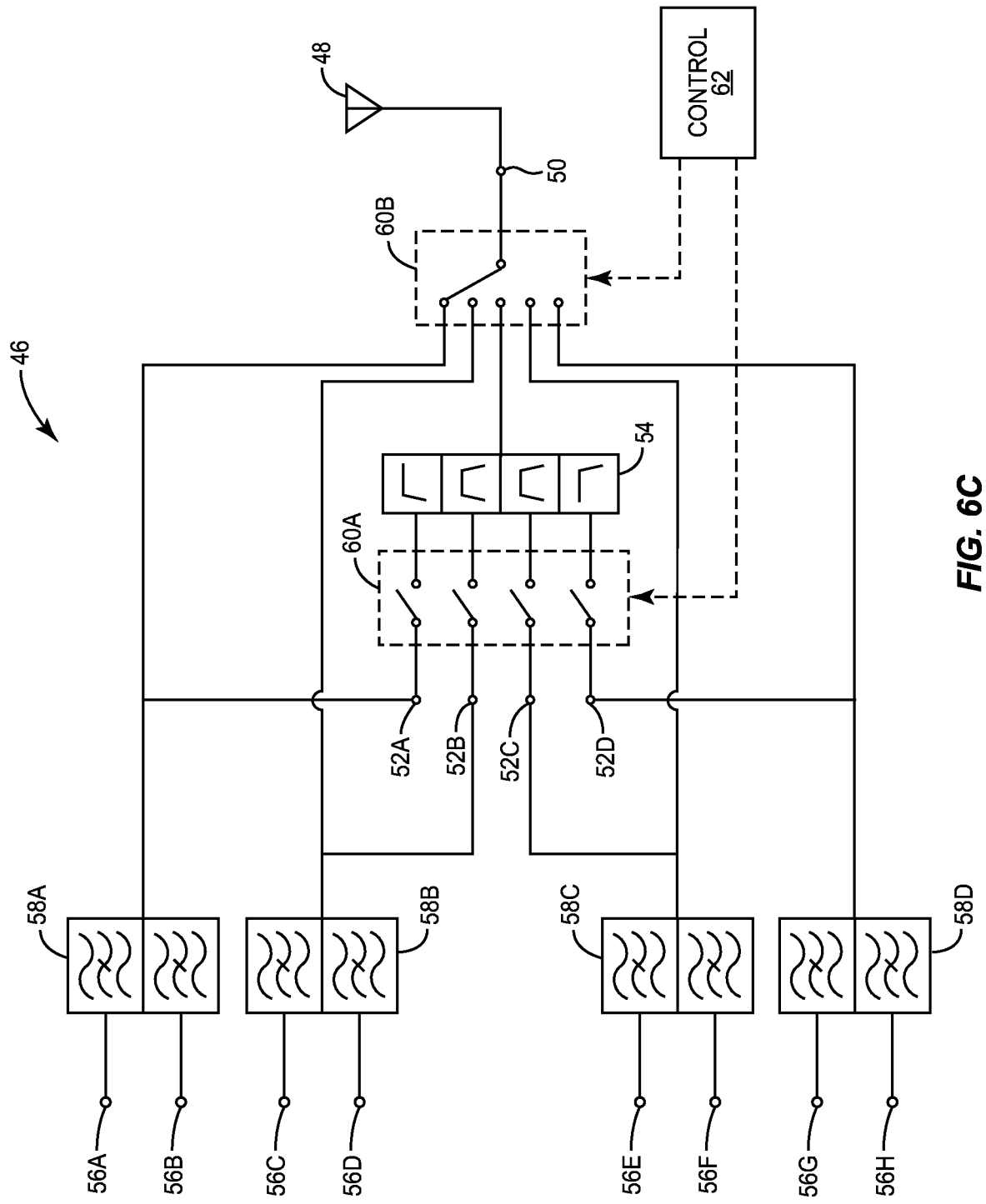

When transmitting, i.e., during a timeslot of a TDD frame designated for uplink, the bypass control circuitry 62 is configured to couple the antenna node 50 directly to one of the input/output nodes 52 and thus reduce insertion loss in the transmit path of the RF front end circuitry 46 as shown in FIG. 6C. Further, the antenna node 50 and the remaining input/output nodes 52 may be isolated from the RF multiplexer circuitry 54 to avoid loading the transmit path. In the example shown in FIG. 6C, an RF transmit signal is provided at the first transceiver node 56A, and only the first input/output node 52A is coupled to the antenna node 50, such that a direct path from the first transceiver node 56A to the antenna 48 is provided. The remaining switches are left open to avoid indirectly loading the transmit path. Accordingly, an RF transmit signal provided at the first transceiver node 56A is filtered by the first duplexer 58A and provided directly to the antenna 48, completely bypassing the RF multiplexer circuitry 54. This results in significant reductions in the insertion loss of the transmit path, which increases efficiency and improves battery life. In one embodiment, an insertion loss between the input/output nodes 52 and the antenna node 50 during transmission (when the RF multiplexer circuitry 54 is bypassed) is between about 0.3 dB and 1.0 dB, while an insertion loss between the input/output nodes 52 and the antenna node 50 during reception is between about 1.3 dB in 2.2 dB. While discussed above with respect to an RF transmit signal at the first transceiver node 56A, the same principles of operation apply to RF transmit signals provided at the third transceiver node 56C, the fifth transceiver node 56E, and the seventh transceiver node 56G, as will be appreciated by those skilled in the art.

The bypass control circuitry 62 operates the switches in the bypass circuitry 60 to synchronize with the timeslots within a TDD frame. As discussed above, the configuration of the switches changes based on whether the particular timeslot is an uplink timeslot or a downlink timeslot. Further, the configuration of the switches changes based on whether an RF transmit signal is provided at the first transceiver node 56A, the third transceiver node 56C, the fifth transceiver node 56E, or the seventh transceiver node 56G. Providing the bypass circuitry 60 and operating it in this manner allows the RF front end circuitry 46 to operate in carrier aggregation modes of operation in which bandwidth from two or more TDD operating bands is aggregated while avoiding the decreased transmit performance normally associated with such configurations.

FIG. 7A shows the RF front end circuitry 46 according to an additional embodiment of the present disclosure. The RF front end circuitry 46 shown in FIG. 7A is substantially similar to that shown above with respect to FIG. 5A, except that the first duplexer 58A is separated into a first transmit filter 64A and a first receive filter 64B, and the second duplexer 58B is separated into a second transmit filter 66A and a second receive filter 66B. Further, a third input/output node 52C and a fourth input/output node 52D are provided. The first transmit filter 64A is coupled between the first transceiver node 56A and the first input/output node 52A. The first receive filter 64B is coupled between the second transceiver node 56B and the second input/output node 52B. The second transmit filter 66A is coupled between the third transceiver node 56C and the third input/output node 52C. The second receive filter 66B is coupled between the fourth transceiver node 56D and the fourth input/output node 52D.

Figure 7B:
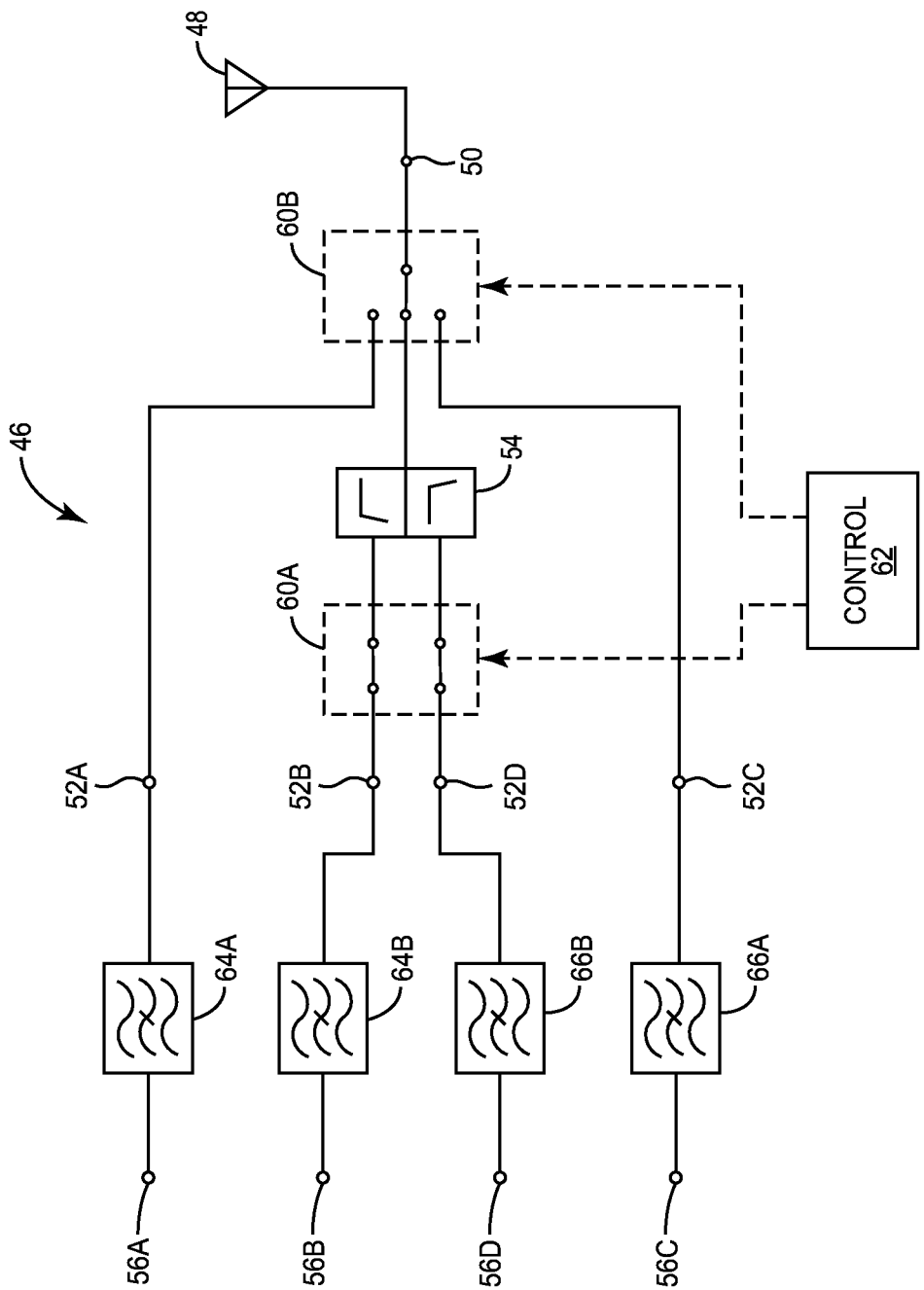

In short, FIG. 7A merely illustrates that the concepts of the present disclosure described above may be used when the functionality of the first duplexer 58A and the second duplexer 58B are provided in separate filtering elements. When receiving, i.e., during a timeslot of a TDD frame designated for downlink, the bypass control circuitry 62 is configured to couple the antenna node 50, the second input/output node 52B, and the third input/output node 52C to the RF multiplexer circuitry 54 as shown in FIG. 7B. Accordingly, RF receive signals from the antenna 48 are provided to the RF multiplexer circuitry 54 and routed appropriately as discussed above with respect to FIGS. 5A through 5C. Accordingly, two RF receive signals may be simultaneously received by the RF front end circuitry 46.

Figure 7C:
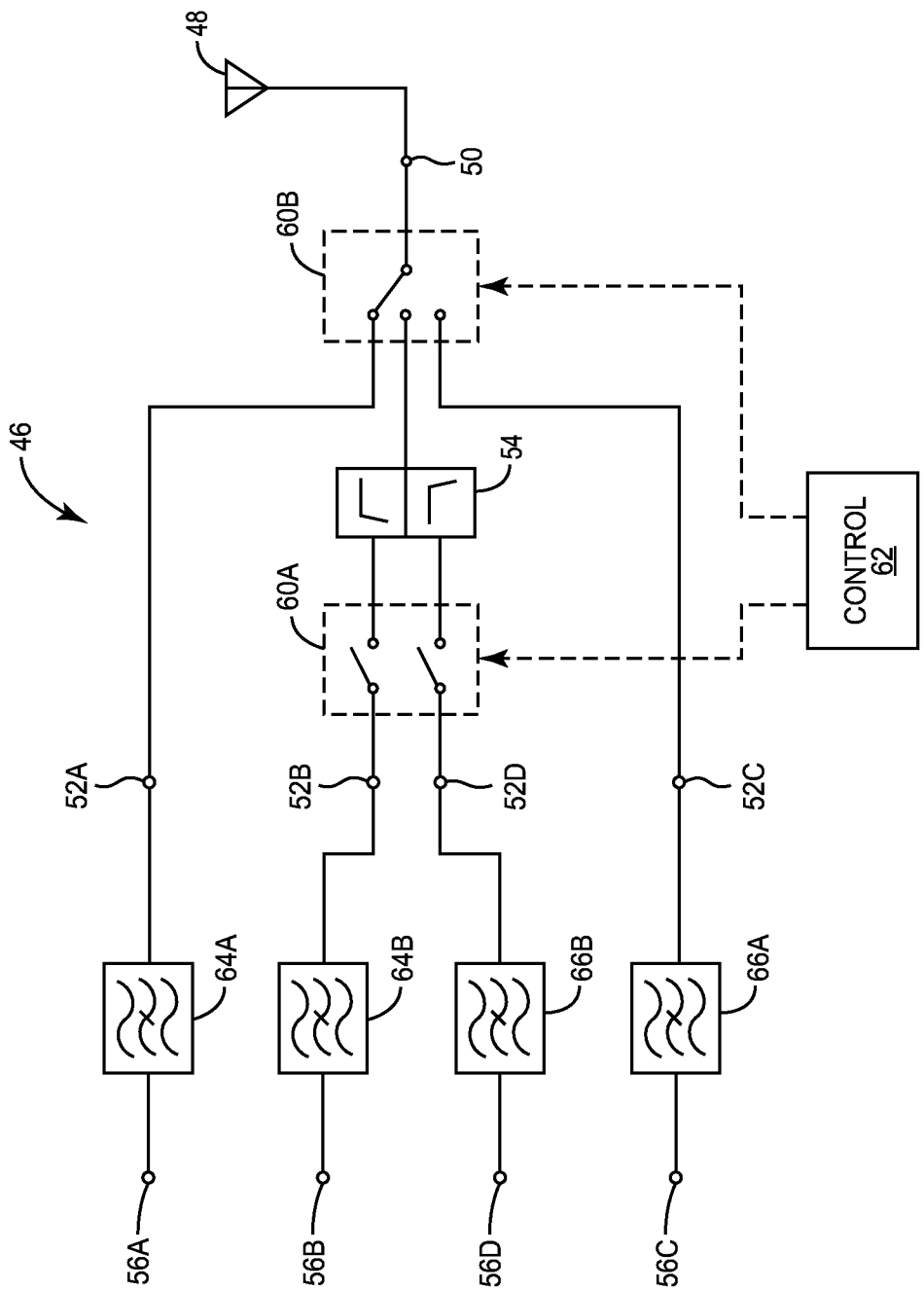

When transmitting, i.e., during a timeslot of a TDD frame designated for uplink, the bypass control circuitry 62 is configured to couple the antenna node 50 directly to the first input/output node 52A or the third input/output node 52C, such that the input/output node at which an RF transmit signal is provided is coupled directly to the antenna 48 and bypasses the RF multiplexer circuitry 54 as discussed above. FIG. 7C shows an example in which the first input/output node 52A is directly coupled to the antenna node 50 and thus the antenna 48. This results in significant reductions in the insertion loss of the transmit path, which increases efficiency and improves battery life.

Figure 8A:
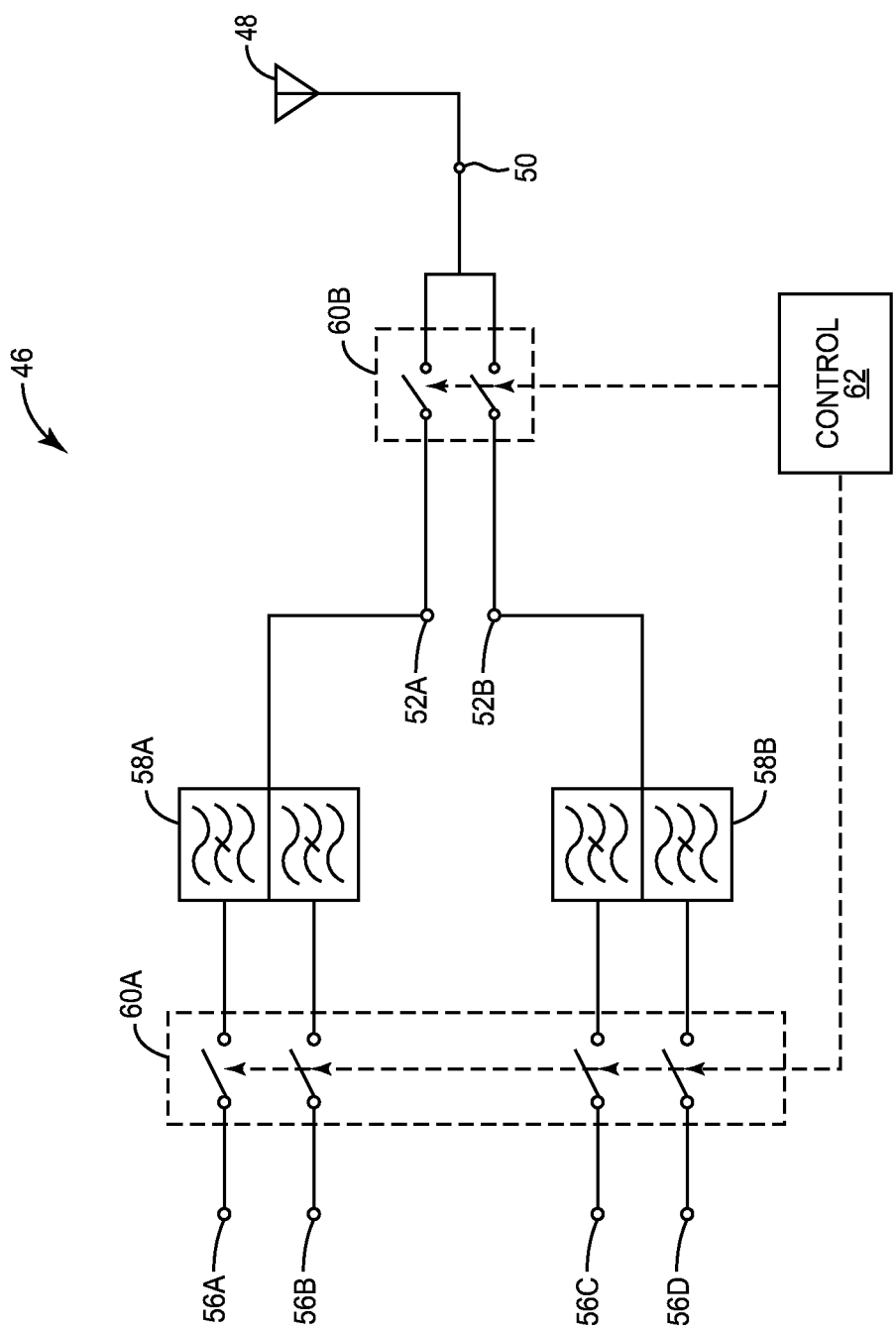
FIGS. 8A-8C illustrate RF front end circuitry according to one embodiment of the present disclosure.

FIG. 8A shows the RF front end circuitry 46 according to an additional embodiment of the present disclosure. The RF front end circuitry 46 shown in FIG. 8A is substantially similar to that discussed above with respect to FIG. 5A, except that the RF multiplexer circuitry 54 is not provided. Accordingly, the first bypass circuitry 60A is coupled between the transceiver nodes 56 and the duplexer circuitry 58, and the second bypass circuitry 60B is coupled between the input/output nodes 52 and the antenna node 50. In some carrier aggregation configurations (e.g., between two operating bands that are relatively close to one another such as in contiguous intra-band carrier aggregation configurations), the RF multiplexer circuitry 54 may be unnecessary to separate the larger RF signal bands (e.g., low-band from high-band). The RF front end circuitry 46 shown in FIG. 8A may be used in such circumstances. In general, FIG. 8A illustrates that the principles of the present disclosure may be used even when an RF multiplexer is not present.

Figure 8B:
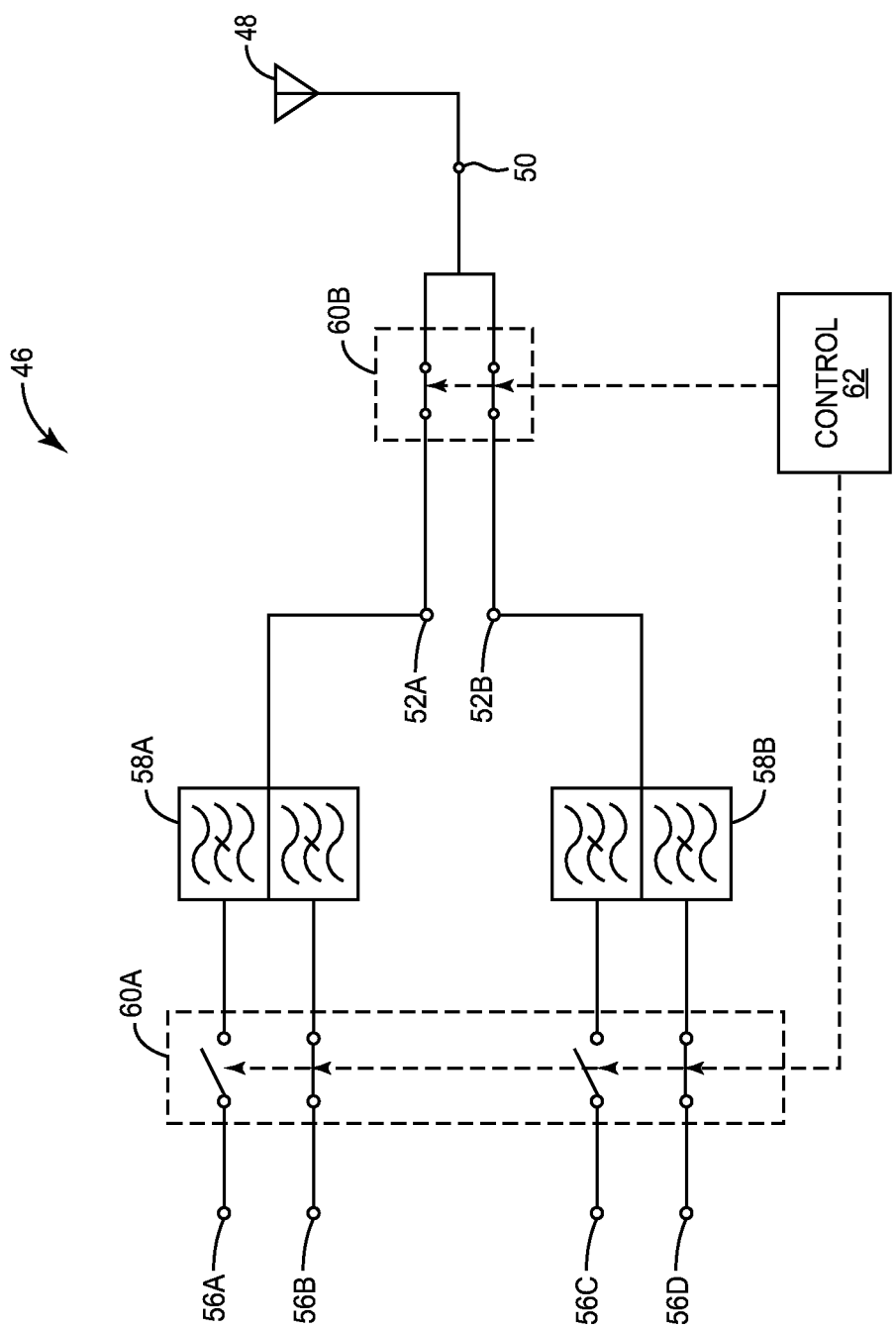

When receiving, i.e., during a timeslot of a TDD frame designated for downlink, the bypass control circuitry is configured to couple the antenna node 50 to each one of the input/output nodes 52 as shown in FIG. 8B. Further, only the second transceiver node 56B and the fourth transceiver node 56D may be coupled to the first duplexer 58A and the second duplexer 58B, respectively. Accordingly, RF receive signals from the antenna 48 are provided to the first duplexer 58A and the second duplexer 58B. RF receive signals within one or more first operating bands are isolated by the first duplexer 58A and provided to the second transceiver node 56B. RF receive signals within one or more second operating bands are isolated by the second duplexer 58B and provided to the fourth transceiver node 56D. As discussed above, the one or more first operating bands and the one or more second operating bands may be contiguous or close to one another such that both the one or more first operating bands and the one or more second operating bands are both low-band operating bands, mid-band operating bands, high-band operating bands, or ultra high-band operating bands. Accordingly, two RF receive signals may be simultaneously received by the RF front end circuitry 46.

Figure 8C:
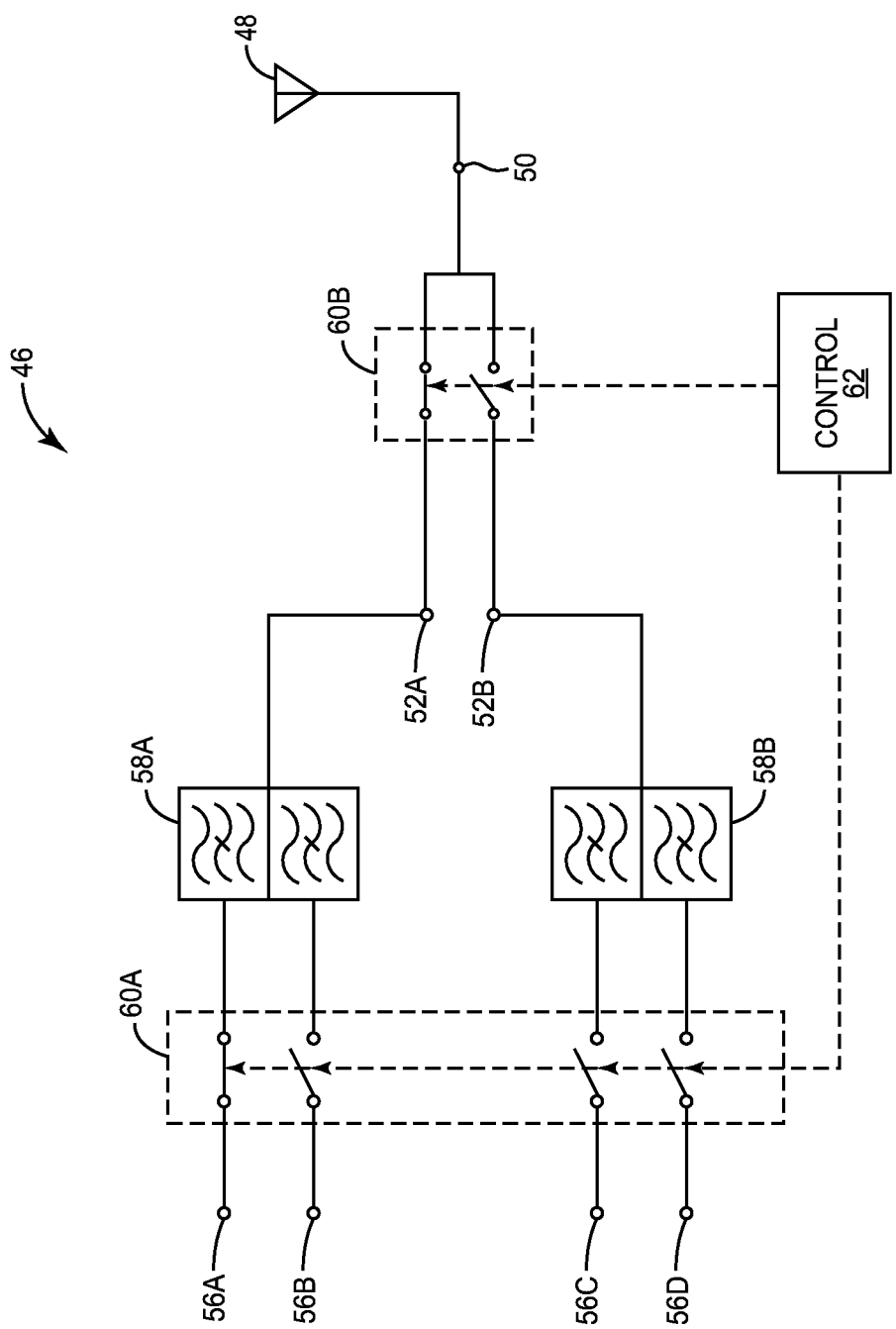

When transmitting, i.e., during a timeslot of a TDD frame designated for uplink, the bypass control circuitry 62 is configured to couple only one of the input/output nodes 52 to the antenna node 50. Further, only the one of the transceiver nodes 56 at which an RF transmit signal is provided is coupled to the appropriate duplexer. In the example shown in FIG. 8C, an RF transmit signal is provided at the first transceiver node 56A, and thus the first transceiver node 56A is coupled to the first duplexer 58A, and the first input/output node 52A is coupled to the antenna node 50. The remaining switches are left open to avoid loading the transmit path of the RF front end circuitry 46. By providing a direct connection between the first transceiver node 56A and the antenna 48, and by disconnecting the second duplexer 58B from the antenna node 50 during transmit, the insertion loss between the first input/output node 52 and the antenna node 50 is significantly reduced, thereby resulting in increased efficiency and improved battery life.

Figure 9:
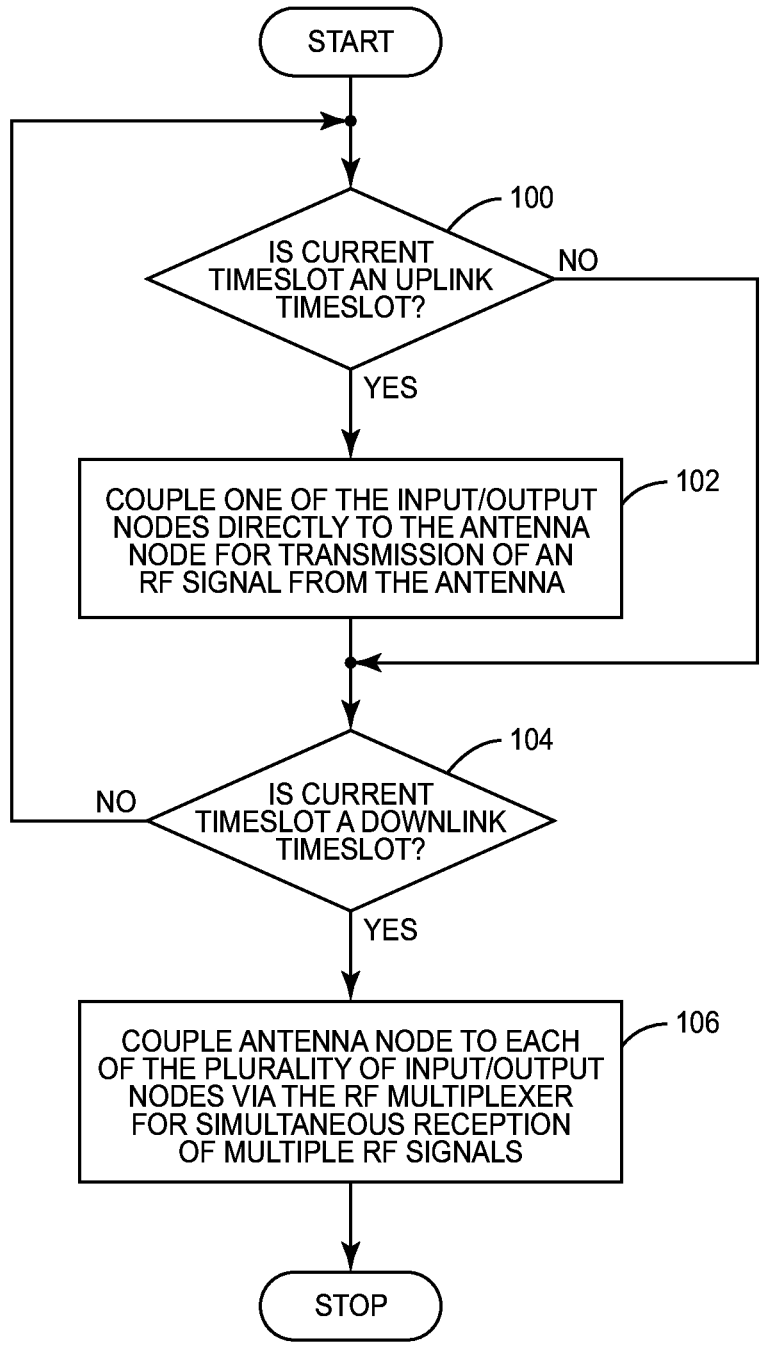
FIG. 9 is a flow diagram illustrating a method of operating RF front end circuitry according to one embodiment of the present disclosure.

FIG. 9 is a flow diagram illustrating a method of operating RF front end circuitry according to one embodiment of the present disclosure. The flow diagram is discussed as it relates to the RF front end circuitry 46 shown in FIG. 5A, however, such a method may be applied to RF front end circuitry of any type or configuration. First, a decision is made regarding whether or not the current timeslot in an TDD frame is an uplink timeslot (step 100). If the current timeslot is an uplink timeslot, one of the input/output nodes 52 is coupled directly to the antenna node 50 for transmission of an RF transmit signal from the antenna 48, while disconnecting the other input/output nodes 52 from the RF multiplexer circuitry 54 (step 102). If the current timeslot is not an uplink timeslot, a decision is then made regarding whether or not the current timeslot is a downlink timeslot (step 104). If the current timeslot is a downlink timeslot, the antenna node 50 is coupled to each one of the input/output nodes 52 via the RF multiplexer circuitry 54 for simultaneous reception of multiple RF receive signals (step 106). If the current timeslot is not a downlink timeslot, the process starts over at step 100.

As discussed herein, low-band RF signals are RF signals with a frequency below about 1 GHz, low/mid-band RF signals are RF signals with a frequency below about 1.4 GHz, mid-band RF signals are RF signals with a frequency between about 1.7 GHz and 2.0 GHz, high-band RF signals are RF signals with a frequency between about 2.3 GHz and 2.7 GHz, and ultra high-band RF signals are RF signals with a frequency between about 3.4 GHz and 3.8 GHz.

Those skilled in the art will recognize improvements and modifications to the embodiments of the present disclosure. All such improvements and modifications are considered within the scope of the concepts disclosed herein and the claims that follow.

What is claimed is:

1. Circuitry comprising:
   an antenna node;
   a plurality of input/output nodes configured to pass RF transmit signals and RF receive signals;
   RF multiplexer circuitry coupled between the plurality of input/output nodes and the antenna node, the RF multiplexer circuitry configured to:
      pass the RF transmit signals and the RF receive signals within a first frequency band between the antenna node and a first one of the plurality of input/output nodes, while attenuating the RF transmit signals and the RF receive signals outside the first frequency band; and
      pass the RF transmit signals and the RF receive signals within a second frequency band between the antenna node and a second one of the plurality of input/output nodes, while attenuating the RF transmit signals and the RF receive signals outside the second frequency band; and
   bypass circuitry coupled to the plurality of input/output nodes and the antenna node the bypass circuitry comprises control circuitry configured to:
      in each uplink time slot of a time division duplex (TDD) frame, couple any one of the plurality of input/output nodes directly to the antenna node such that the RF multiplexer circuitry is bypassed; and
      in each downlink time slot of the TDD frame, couple each one of the plurality of input/output nodes to the antenna node via the RF multiplexer circuitry to receive simultaneously the RF receive signals within the first frequency band and the RF receive signals within the second frequency band.

2. The circuitry of claim 1, wherein the bypass circuitry is further configured to, in each uplink time slot of the TDD frame:
   isolate each one of the plurality of input/output nodes not coupled directly to the antenna node from the RF multiplexer circuitry; and
   isolate the antenna node from the RF multiplexer circuitry.

3. The circuitry of claim 2, wherein the bypass circuitry is further configured to, in each downlink time slot of the TDD frame:
   directly couple the antenna node to the RF multiplexer circuitry; and
   directly couple each one of the plurality of input/output nodes to the RF multiplexer circuitry.

4. The circuitry of claim 1, wherein the bypass circuitry comprises:
   first bypass circuitry configured to selectively couple the plurality of input/output nodes to the RF multiplexer circuitry; and
   second bypass circuitry configured to selectively couple the antenna node to the RF multiplexer circuitry.

5. The circuitry of claim 4, wherein the control circuitry is further configured to operate the first bypass circuitry and the second bypass circuitry.

6. The circuitry of claim 1, wherein in each uplink time slot of the TDD frame, an RF transmit signal is provided at the first one of the plurality of input/output nodes and the second one of the plurality of input/output nodes such that the RF transmit signal is delivered directly from the first one of the plurality of input/output nodes and the second one of the plurality of input/output nodes to the antenna node.

7. The circuitry of claim 1, wherein in each uplink time slot of the TDD frame an insertion loss between the first one of the plurality of input/output nodes and the second one of the plurality of input/output nodes and the antenna node is between 0.3 dB and 1.0 dB.

8. The circuitry of claim 7, wherein in each downlink time slot of the TDD frame an insertion loss between the antenna node and each one of the plurality of input/output nodes is between 1.3 dB and 2.2 dB.

9. The circuitry of claim 1 further comprising:
   first duplexer circuitry coupled to the first one of the plurality of input/output nodes and configured to pass the RF transmit signals within the first frequency band between a first transmit node and the first one of the plurality of input/output nodes while attenuating other RF transmit signals, and pass the RF receive signals within the first frequency band between the first one of the plurality of input/output nodes and a first receive node while attenuating other RF receive signals; and
   second duplexer circuitry coupled to the second one of the plurality of input/output nodes and configured to pass the RF transmit signals within the second frequency band between a second transmit node and the second one of the plurality of input/output nodes while attenuating other RF transmit signals, and pass the RF receive signals within the second frequency band between the second one of the plurality of input/output nodes and a second receive node while attenuating other RF receive signals.

10. The circuitry of claim 1 further comprising an antenna coupled to the antenna node.

11. The circuitry of claim 10 further comprising transceiver circuitry coupled to the plurality of input/output nodes.

12. The circuitry of claim 1, wherein the first frequency band and the second frequency band are different long term evolution (LTE) TDD operating bands.

* * * * *